Sept. 9, 1958

K. V. KEELEY
THREE TERMINAL TELEPHONE SUBSTATION
AND SYSTEM EMBODYING THE SAME
Filed June 25, 1956

2,851,528

KEDRIC V. KEELEY
INVENTOR.

BY [signature]

ATTORNEY.

United States Patent Office 2,851,528

Patented Sept. 9, 1958

2,851,528

THREE TERMINAL TELEPHONE SUBSTATION AND SYSTEM EMBODYING THE SAME

Kedric V. Keeley, Los Angeles, Calif., assignor to Charles L. Craddock, North Hollywood, Calif.

Application June 25, 1956, Serial No. 593,458

8 Claims. (Cl. 179—1)

This invention relates to telephone systems and particularly to a substation wiring circuit.

It is an object of the invention to provide a three-terminal circuit substation for a telephone which will adapt the latter to be installed in series with a number of other like substations in a simple, low-cost telephone system, including a central switchboard, for telephonic communication from any of said substations with the operator at the switchboard. Such a system is useful in reporting fires to a fire department; in making telephonic reports to a police headquarters; and is adapted for use along highways to provide telephonic means for reporting emergencies.

It is an object of the invention to provide such a three-terminal circuit for a telephone substation which will permit the substations of the system to be serviced by a single electrical conductor connecting the substations in series and which will permit any of these substations to be employed for telephonic communication with the switchboard notwithstanding a break at one point in said conductor.

Telegraphic fire alarm systems, in which a number of alarm boxes are connected in series with a headquarters switchboard by a single metallic conductor have long been in use. In such systems provision is made for employing the ground as a second conductor between any of the alarm boxes and the switchboard for rendering that box operative in the event a break occurs anywhere in the metallic main circuit conductor. In such a system, each alarm box is provided with means automatically operative in each box when the latter is in use for sending a telegraphic signal through a circuit connecting this box with the switchboard by means of the ground and that portion of the aforesaid metallic conductor located on the side of the alarm box where this conductor remains unbroken.

It is another object of the present invention to provide a three-terminal circuit for a telephone substation whereby said substation will be operative by providing an alternate circuit between that substation and the switchboard when the metallic conductor is broken to one side or the other of said substation.

It is a further object of the invention to provide such a three-terminal circuit for a telephone substation which will adapt itself electrically in the manner aforesaid upon the breaking of the metallic conductor of the system on one side or the other of the substation and will do this automatically without requiring any action on the part of the person making the call from said substation.

It is a further object of the invention to provide a telephone substation having a three-terminal circuit which is so arranged that without any internal alteration, any two of said three terminals can be used for connecting said substation in any operative electrical circuit with another telephone.

The manner of accomplishing the foregoing objects as well as other objects and advantages will be made manifest in the following description taken in connection with the accompanying drawings in which.

Figure 1:
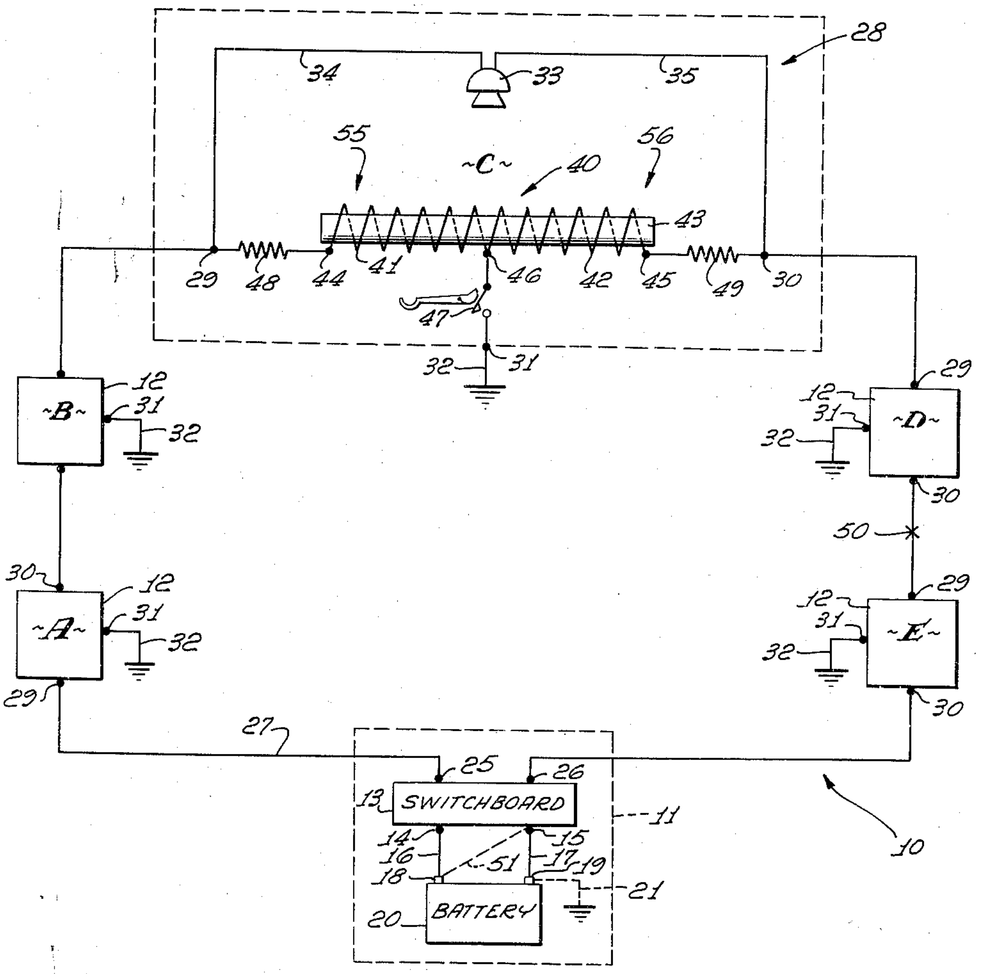
Fig. 1 is a wiring diagram of a multi-substation telephone system including a detail wiring diagram of a preferred embodiment of the three-terminal substation of the present invention, this view showing said substation when it includes a telephone transmitter of the variable resistance type but no receiver.

Referring specifically to the drawings, the invention is there shown for illustrative purposes as incorporated in a telephone system 10. This system includes a telephone headquarters 11 and five perimetral substations 12 which are individually designated as substations A, B, C, D, and E.

The headquarters 11 is equipped with a switchboard 13 having internal terminals 14 and 15 which are connected by wires 16 and 17 to discharge terminals 18 and 19 of a storage battery 20. The switchboard 13 has external terminals 25 and 26 which connect respectively to opposite ends of a metallic main circuit conductor 27 which connects all of the perimetral substations 12 in series.

Each of the substations 12 includes a three-terminal electric circuit 28 which is illustrated in an enlarged diagrammatic showing of substation C in Fig. 1.

The circuit 28 includes three main substation terminals 29, 30 and 31. Contiguous portions of the main circuit conductor 27 connect to the main substation terminals 29 and 30. The terminal 31 is grounded by a ground wire 32.

As shown in Fig. 1 the substation circuit 28 includes a two-terminal variable-resistance-type telephone transmitter 33, the terminals of which are connected respectively by wires 34 and 35 to main unit system terminals 29 and 30.

Each circuit 28 also includes a split-choke coil 40 comprising two coils 41 and 42 which are wound consecutively on a common core 43, the coils 41 and 42 having end terminals 44 and 45 and being connected at their inner adjoining ends to a middle terminal 46 which connects through a normally open telephone hook switch 47 to the main unit terminal 31.

Connected at its opposite ends to terminals 29 and 44 is a resistance element 48. In like manner a resistance element 49 is provided with its opposite ends connected to terminals 30 and 45. The desired values of resistance elements 48 and 49 are dependent upon the value of the inherent resistances of the coils 41 and 42 and such desired values may be zero if such inherent resistances of coils 41 and 42 are each sufficiently high.

There are three different conditions under which each of the substations 12 is caused to function in a proper manner by virtue of the mode of operation inherent in the three-terminal electric circuit 28 of that substation. The first of these conditions is the normal condition in which the metallic main circuit conductor 27 is unbroken and connects all of the substations 12 in series in an endless main circuit including the external terminals 25 and 26 of the switchboard 13. Under this condition the choke coil 40 and resistance elements 48 and 49 are connected as a unit in series between the terminals 29 and 30 and offer a considerable aggregate resistance to the flow therethrough of the current delivered along the main circuit conductor 27 to that substation 12. As the transmitter 33 is connected between the main substation terminals 29 and 30 in parallel with the split-choke coil 40 and resistance elements 48 and 49, and as the transmitter 33 has an approximately similar resistance value, a substantial portion of the current flowing through each substation 12 will pass through the transmitter 33 and will render the main electrical circuit formed by the conductor 27 operatively responsive to fluctuations in resistance in the transmitter 33 set up by speaking into this, thereby energizing the receiver of the switchboard telephone through which the switchboard operator is communicating with the person talking into transmitter 33. In this mode of operation it should be noted that the only closed ground connection of the system is via switch 47 of substation C which has been closed by the removal of the telephone handset (not shown), embodying transmitter 33, from the suspension arm of said switch.

The second condition met with in the operation of the system 10 is where the main circuit conductor 27 is broken at one point therein, as indicated at 50, which for illustrative purposes is shown as occurring between substations D and E. When this occurs, the switchboard automatically reacts to notify the operator of a break in the conductor 27 whereupon the operator opens the connection between terminal 15 and battery terminal 19 by wire 17, and connects terminal 15 by wire 51 with battery terminal 18 and also connects battery terminal 19 to ground through ground wire 21. The effect of this is to convert all of the substations 12 from the mode of operation above described to a mode of operation in which each of these substations depends upon an independent connection through the ground between its main terminal 31 (when its telephone handset is removed from its suspension arm) and the battery terminal 19 to complete the circuit between that substation and the switchboard 13.

Under this new mode of operation, each substation electrical circuit 28 such as that shown in detail in Fig. 1 for substation C, with its switch 47 closed, operates as follows:

A portion of the line current will now flow from the system circuit wire 27 through main substation terminal 29 of substation C, through resistance element 48, coil 41, terminal 46, switch 47, main terminal 31, and wire 32 to the ground.

Another portion of the system line current will flow from main substation terminal 29 through conductor 34, transmitter 33, conductor 35, main terminal 30, resistance element 49, coil 42, terminal 46, switch 47, main terminal 31 and wire 32 to the ground.

It is to be noted that while the windings of the wire in the coils 41 and 42 are applied in the same direction about the common core 43 for these coils, and, while the steady static currents in these coils are therefore in magnetic opposition under the new mode of operation, nevertheless, the respective current variations caused simultaneously in coils 41 and 42 by variations in the resistance of transmitter 33, will be inductively additive and will each contribute to the inductive voltage variations produced between terminals 44 and 31. Therefore, variations in the resistance of transmitter 33 and the resulting variations of currents in coils 41 and 42 and the resulting variations in induced voltage between terminals 44 and 31 all contribute to causing variations of current flowing from the switchboard, thereby energizing the receiver of the switchboard telephone through which the switchboard operator is communicating with the person talking into transmitter 33.

A third mode of operation would be when conductor 27 is broken at one point on the other side of substation C such as between substations A and B. By observing the electrical symmetry of construction of substation C it is clear that the operation in this third mode would be similar to the operation in the second described mode but that the functioning of the symmetrical elements would be transposed.

The transmitter 33 is thus automatically rendered effective for conducting conversation between any telephone substation 12 and the switchboard 13 when a single break occurs at any one point in the main conductor 27.

Figure 3:
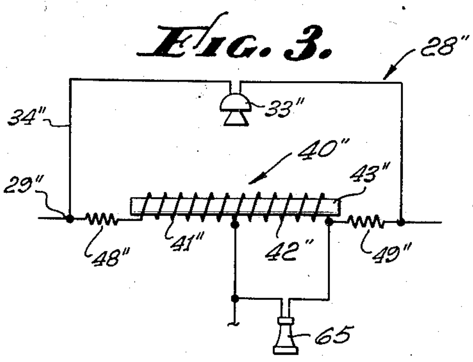
Fig. 3 is a view similar to Fig. 2 and illustrates a second modified form of the invention in which a different method is employed for including both a receiver and a transmitter of the variable resistance type in said substation.
Figure 2:
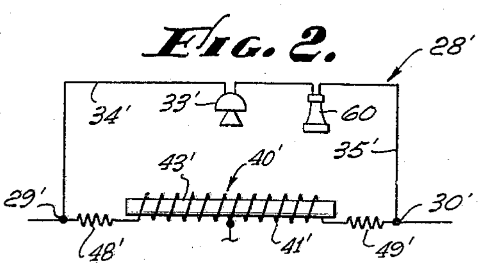
Fig. 2 is a wiring diagram of a modified form of the three-terminal substation circuit of the invention and illustrates one preferred manner of including both a receiver and a transmitter of the variable resistance type in said substation circuit.

For simplification, the invention is disclosed in Fig. 1 as embodied in a substation electrical circuit 28 including merely a microphone or transmitter 33 and omitting any telephone receiver. A telephone receiver may readily be included in such a circuit, however, and two ways of doing this are shown in Fig. 2 and 3 which are fragmentary in that they omit showing the hook switch which makes connection with ground when the handset is lifted from its hook. Elements in Fig. 2 having corresponding elements in Fig. 1 will be referred to by the same reference numeral with prime added. In Fig. 3 such elements will receive the same reference numeral with double prime added.

Fig. 2 illustrates a substation electrical circuit 28′ which is identical with the circuit 28 excepting that the variable resistance transmitter 33′ thereof has a receiver 60 connected in series therewith in one of two conductors 34′ and 35′ which connect the transmitter 33′ with substation terminals 29′ and 30′. The receiver 60 is thus responsive to fluctuations in current originating in the transmitter of the telephone at the switchboard 13 and passing through circuit 28′ either when the main line conductor 27 is unbroken or when this is broken as at point 50 or on the opposite side of the circuit 28′ so as to operate the receiver 60 to produce sounds audible to the operator of the substation embodying circuit 28′.

A substation electrical circuit 28″ is shown in Fig. 3 which is just like circuit 28 but has a telephone receiver 65 which is connected in parallel with the coil 42″ of the split-choke coil 40″. The receiver 65 thus shares in the current flowing through the coil 42″ no matter what the condition is under which the circuit 28″ is functioning and produces audible sounds as a result of fluctuations in said current originating in a voice transmitter located at the switchboard.

The claims are:

1. In a telephone substation the combination of: a first main terminal; a second main terminal; a third main terminal; a two-terminal telephone transmitter; electrical conductor means capable of conducting both an alternating current and a steady flow of direct current for connecting the terminals of said transmitter respectively to said first main terminal and said second main terminal; a split-choke coil having end terminals and a middle terminal; conductor means capable of conducting both an alternating current and a steady flow of direct current for connecting the end terminals of said split-choke coil respectively to said first and second main terminals; and conductor means capable of conducting both an alternating current and a steady flow of direct current for connecting the middle terminal of said split-choke coil to said third terminal said substation being dependent on an external battery and being rendered operative by connecting said battery to any two of said three main substation terminals.

2. A combination as in claim 1 in which resistance elements are included in the conductor means connecting opposite end terminals of said split-choke coil respectively to said first and second main terminals.

3. A combination as in claim 2 including telephone receiver means capable of conducting both an alternating current and a steady flow of direct current and which is connected in series with said transmitter between the latter and one of said first and second main terminals.

4. A combination as in claim 1 including telephone receiver means capable of conducting both an alternating current and a steady flow of direct current, the terminals of which means are connected respectively to one end terminal of said split-choke coil and to the middle terminal of the latter.

5. In a multi-substation telephone system, the combination of: a series of substations, each as defined in claim 1; a central station; metallic main circuit conductor means connecting said central station and said substations in an endless series, said conductor means separately connecting said central station with a first main terminal and a second main terminal respectively of the two substations adjacent said central station in said series, said conductor means also separately connecting a first main terminal of one of each adjacent pair of substations in said series to the second main terminal of the other substation of said pair; ground conductor means for grounding the third main terminal of each of said substations; a normally open hook switch interposed, in each substation, between the middle choke coil terminal and the third main terminal thereof, said hook switch being closed only while a call is being made from said substation; and a central station ground means providing a ground connection between said central station and the third main terminal of any substation calling said central station when a break occurs in said metallic main circuit conductor means.

6. A combination as in claim 5 in which said central station ground means normally forms no ground connection but is adapted to form such a ground connection immediately upon actuation by the operator of the central station upon a break occurring in said metallic main circuit conductor means.

7. A telephone substation dependent for operation on a battery external to said substation, said substation comprising: a variable resistance transmitter having two terminals; first and second substation terminals; a split-choke coil having two end terminals and a middle terminal, which may function as a third substation terminal; and electrical conductor means providing a continuous direct electrical connection between said coil end terminals respectively and said first and second substation terminals, and between said first and second substation terminals respectively, and said transmitter terminals, said substation being rendered operative for sending an audible message from said transmitter by impressing an external battery on any two of said three substation terminals in an electrical circuit containing a telephone receiver.

8. A telephone substation comprising: a variable resistance transmitter having two terminals; first, second and third substation terminals; a split-choke coil having two end terminals and a middle terminal; electrical conductor means providing unbroken electrical connections respectively between said two coil end terminals, said first and second substation terminals and said two transmitter terminals; means for electrically connecting said middle coil terminal to said third substation terminal; and external circuit means including a source of electric potential and a telephone receiver and adapted to render said substation operative for transmitting an audible message from said transmitter to said receiver by connecting said substation in said circuit means through any two of said substation terminals.

References Cited in the file of this patent

UNITED STATES PATENTS

| | | |
|---|---|---|
| 1,232,884 | Benson | July 10, 1917 |
| 2,069,038 | Labaugh | Jan. 26, 1937 |

OTHER REFERENCES

Telephone Communication, by Wright, page 139, published 1925.